(12) United States Patent
Hochman et al.

(10) Patent No.: US 10,310,554 B2
(45) Date of Patent: Jun. 4, 2019

(54) FOLDING DISPLAY PANELS FOR LARGE-FORMAT DISPLAYS

(71) Applicant: Revolution Display, LLC, Glendale, CA (US)

(72) Inventors: Jeremy Hochman, Walnut, CA (US); Arnaud Latombe, Round Rock, TX (US)

(73) Assignee: Production Resource Group, L.L.C., Armonk, NY (US)

( * ) Notice: Subject to any disclaimer, the term of this patent is extended or adjusted under 35 U.S.C. 154(b) by 316 days.

(21) Appl. No.: 14/972,962

(22) Filed: Dec. 17, 2015

(65) Prior Publication Data

US 2016/0179133 A1   Jun. 23, 2016

Related U.S. Application Data

(60) Provisional application No. 62/094,960, filed on Dec. 20, 2014.

(51) Int. Cl.
| | |
|---|---|
| *G06F 1/16* | (2006.01) |
| *G09F 9/30* | (2006.01) |
| *G09F 9/302* | (2006.01) |

(52) U.S. Cl.
CPC ............ *G06F 1/1607* (2013.01); *G09F 9/301* (2013.01); *G09F 9/3026* (2013.01)

(58) Field of Classification Search
CPC .... G06F 1/1641; G06F 1/1616; G06F 1/1647; G06F 1/1607; G06F 3/1446; G02F 1/13336; G09F 19/226; G09F 19/22
See application file for complete search history.

(56) References Cited

U.S. PATENT DOCUMENTS

| | | |
|---|---|---|
| 5,877,936 A | 3/1999 | Nishitani et al. |
| 6,944,383 B1 | 9/2005 | Herzog et al. |
| 7,063,449 B2 | 6/2006 | Ward |
| (Continued) | | |

FOREIGN PATENT DOCUMENTS

| | | |
|---|---|---|
| EP | 2755195 A1 | 7/2014 |
| WO | 2005077096 A2 | 8/2005 |
| (Continued) | | |

OTHER PUBLICATIONS

European Search Report dated Mar. 18, 2016, in corresponding European Patent Application No. 15200780.3.

(Continued)

*Primary Examiner* — Nitin Patel
*Assistant Examiner* — Amen Bogale
(74) *Attorney, Agent, or Firm* — Downs Rachlin Martin PLLC (57) ABSTRACT

Folding display panels for large-format displays. In an example, the folding display panels are electrically connected by a power cable and a data cable that respectively include a data wire and power wire, and each cable includes a fixed-length section attached at one end to a movable member. When folding adjacent display panels face-to-face, the movable member moves so that the fixed-length section remains taut. Slack in the data wire and power wire accommodate the movement of the corresponding fixed-length section. A column of display panels can be z-folded for compact storage and can be rapidly deployed to form a large-format display.

7 Claims, 9 Drawing Sheets

(56) References Cited

U.S. PATENT DOCUMENTS

| | | |
|---|---|---|
| 7,161,623 B2 | 1/2007 | Kuno |
| 8,007,121 B2 | 8/2011 | Elliott et al. |
| 8,172,097 B2 | 5/2012 | Nearman et al. |
| 8,840,284 B1 * | 9/2014 | Hochman ................ H05K 7/12 362/217.12 |
| 2001/0054986 A1 * | 12/2001 | Leman ................ G06F 1/1616 345/1.1 |
| 2004/0233125 A1 | 11/2004 | Tanghe et al. |
| 2005/0201087 A1 | 9/2005 | Ward |
| 2006/0039142 A1 * | 2/2006 | Temple ................... G09F 9/33 362/231 |
| 2007/0000849 A1 | 1/2007 | Lutz et al. |
| 2007/0001927 A1 | 1/2007 | Ricks et al. |
| 2007/0068055 A1 * | 3/2007 | Segan ....................... G09F 9/33 40/544 |
| 2007/0176854 A1 | 8/2007 | Ward et al. |
| 2007/0218751 A1 * | 9/2007 | Ward ........................ F21S 2/00 439/404 |
| 2011/0291536 A1 * | 12/2011 | Jauvtis ................. G06F 1/1681 312/319.2 |
| 2012/0120033 A1 | 5/2012 | Mittan et al. |

FOREIGN PATENT DOCUMENTS

| | | |
|---|---|---|
| WO | 2008112152 A1 | 9/2008 |
| WO | 2010054380 A2 | 5/2010 |

OTHER PUBLICATIONS https://www.youtube.com/watch?v=-eXVpuUDRmU (Last viewed Dec. 7, 2015).

* cited by examiner

FOLDING DISPLAY PANELS FOR LARGE-FORMAT DISPLAYS

RELATED APPLICATION DATA

This application claims the benefit of priority of U.S. Provisional Patent Application Ser. No. 62/094,960, filed on Dec. 20, 2014, and titled "FOLDING DISPLAY PANELS FOR LARGE-FORMAT DISPLAYS," which is incorporated by reference herein in its entirety.

FIELD

The present disclosure relates to display panels used for large-format displays, and in particular relates to folding display panels for large-format displays.

BACKGROUND

Large-format displays are becoming increasingly popular for use in a wide variety of applications and venues. In certain instances, such as for concerts, performances, etc., the large-format displays need to be moved to the event, quickly set up before the event, dismantled after the event, and then moved into storage or to another event. Consequently, such large-format displays are typically made with modular components.

Yet, modular large-format displays can still be time-consuming to set up, especially for displays with dimensions measured in tens of feet. Such large-format displays can comprise hundreds of modular display panels. These display panels require power and data cabling, which must be individually and manually connected to each display panel.

SUMMARY

To make the setup process for modular large-format displays much faster, pre-attaching the display modules with a hinge mechanism can allow a screen to fan-fold up and down while keeping the panels connected mechanically. For some low-resolution large-format displays that have substantial physical space between the pixels for the wiring, the power and data cables can remain attached. As large-format display technology becomes higher resolution, mechanical accuracy and alignment of the modules becomes much more critical while the space between the pixels becomes so small that there may not even be room for cables.

Accordingly, an aspect of the disclosure is a folding display panel apparatus for a large-format display, comprising: first and second display panels that each include a front side having an array of light-emitting pixels, a back side having a movable member, a top edge, opposite side edges and a bottom edge, with the first and second display panels arranged edge-to-edge; and at least one electrical cable that electrically connects the first and second panels, the at least one electrical cable including at least one data wire and at least one power wire, the at least one electrical cable having a fixed-length cable section that runs between the first and second display panels, wherein one end of the fixed-length section is attached to the movable member, and wherein the data and power wires each have an amount of slack that resides outside of the fixed-length cable section adjacent the movable member, wherein the movable member is configured so that when the first and second display panels are folded front-side to front-side, the movable member moves toward an edge of the one of the first and second display panels to accommodate a bend in the fixed-length section of the at least one cable, while the amount of slack in the data and power wires changes.

Another aspect of the disclosure is a method of making folding display panels for a large-format display, comprising: electrically connecting with at least one electrical cable first and second display panels each having a body with a front face, a back side, a bottom edge and a top edge, the display panels arranged top-edge to bottom-edge and being foldable with respect to one another proximate the bottom edge, with the at least one electrical cable arranged adjacent the respective back sides of the first and second display panels; and attaching a fixed-length cable section of the at least one electrical cable to the first and second display panels, with one end of the fixed-length cable section being attached to a movable member, the movable member being designed and configured to retain substantially uniform tension in the fixed-length cable section during folding of the first and second display panels.

Another aspect of the disclosure is a folding display panel apparatus that includes: first and second display panels arranged edge-to-edge and having respective first and second front faces and respective first and second back sides; a data cable that includes at least one data wire and a power cable that includes at least one power wire, wherein the data cable and power cable are supported adjacent the respective first and second back sides; a movable member operably arranged on the first back side of the first display panel; wherein the data cable and power cable each include fixed-length sections attached to the movable member to define a portion of a flexible hinge; and wherein the movable member of the first display panel is configured to move toward the second display panel when the first and second display panels are folded face-to-face.

Another aspect of the disclosure is a method of unfolding and folding a plurality of display panels for a large-format display, wherein adjacent panels in the plurality of display panels are arranged to fold around a hinge and each of the adjacent panels has a front face that defines a plane, wherein at least one of a power cable and a data cable is connected to each of the plurality of display panels and further wherein the at least one of a power cable and a data cable extend between adjacent panels, the method comprising: unfolding the plurality of display panels about their respective hinges so the panels extend in a linear direction and their front face planes are substantially coplanar; retaining substantially uniform tension in the at least one of a data cable and a power cable extending between adjacent panels during the unfolding step; and folding the plurality of display panels about their respective hinges to cause the panels to move toward one another so the front face planes are positioned in spaced, mutually parallel relationship when fully folded; and retaining substantially uniform tension in the at least one of a data cable and a power cable during the folding step.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. Coordinates are shown in some of the Figures for the sake of reference and are not intended to be limiting as to direction or orientation. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Figure 1:
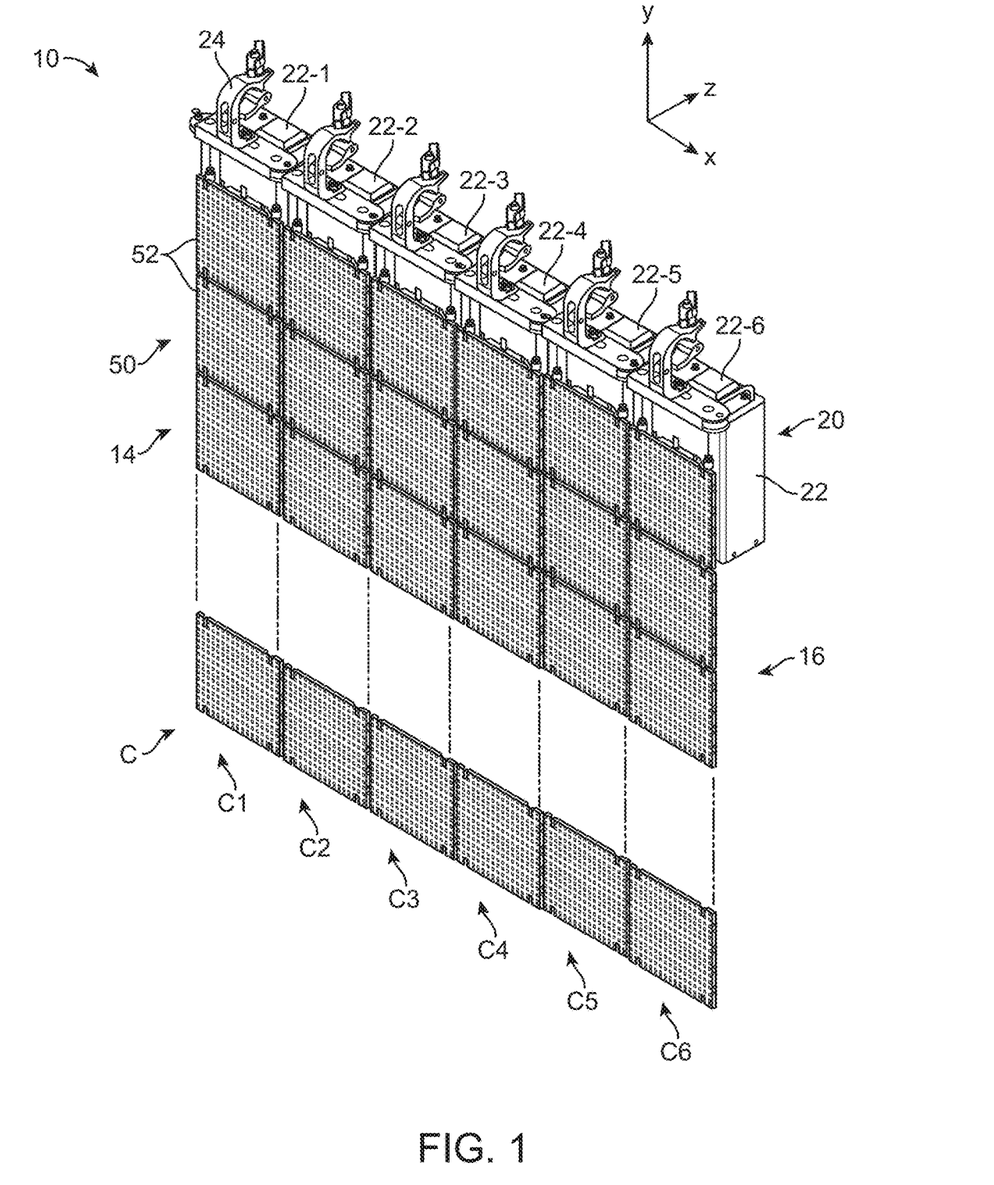
FIG. 1 is a front-elevated view of a large-format display (LFD) system according to the disclosure.

FIG. 1 is a front-elevated view of a large-format display (LFD) system 10 according to an aspect of the disclosure. The LFD system 10 includes a front side 14 and a back side 16. The LFD system 10 includes an array 20 of electrical power and data units 22 (denoted, 22-1, 22-2, ... 22-6) that operably support an array or assembly 50 of foldable display panels ("panels") 52. The panels 52 are also referred to in the art as a "modules" or "waffles." The array or assembly 50 of panels 52 defines a LFD, so that array or assembly 50 is also referred to herein as LFD 50.

The panels 52 of array or assembly 50 are arranged in columns C, e.g., C1, C2, ... Cn, with column Cj downwardly depending from corresponding electrical power and data unit 22-j. In the example LFD system 10 shown in FIG. 1, n=6. The electrical power and data units 22 are shown as each including a mounting bracket 24 that can attach to an elevated horizontal mounting bar (not shown) so that the foldable panels 52 can hang downward from their respective power units to form LFD 50.

Figure 2A:
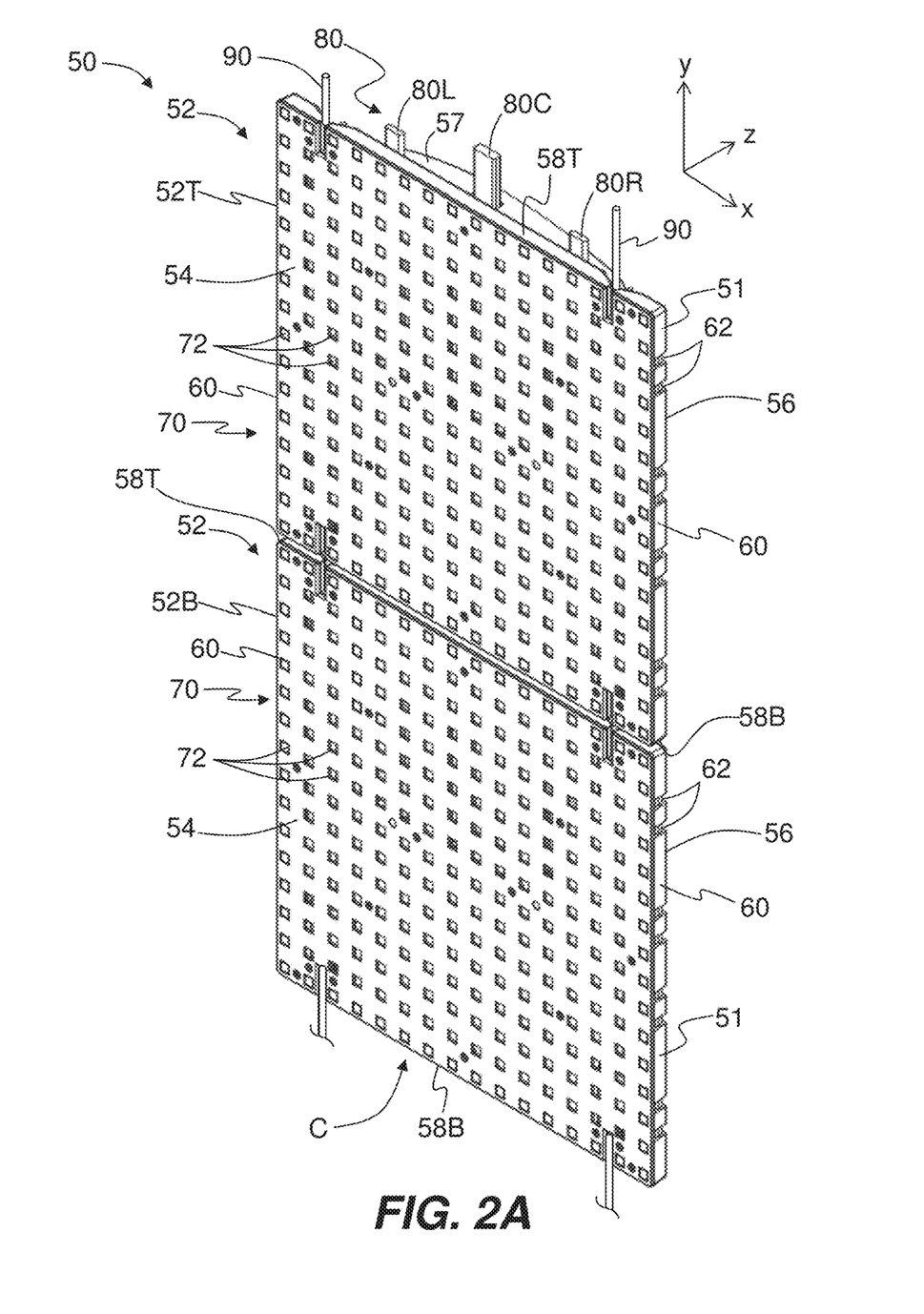
FIG. 2A is a close-up front-elevated view and FIG. 2B is a close-up back-elevated view, which illustrate two example foldable display panels used in the LFD system of FIG. 1 and that form a display panel assembly.
Figure 2B:
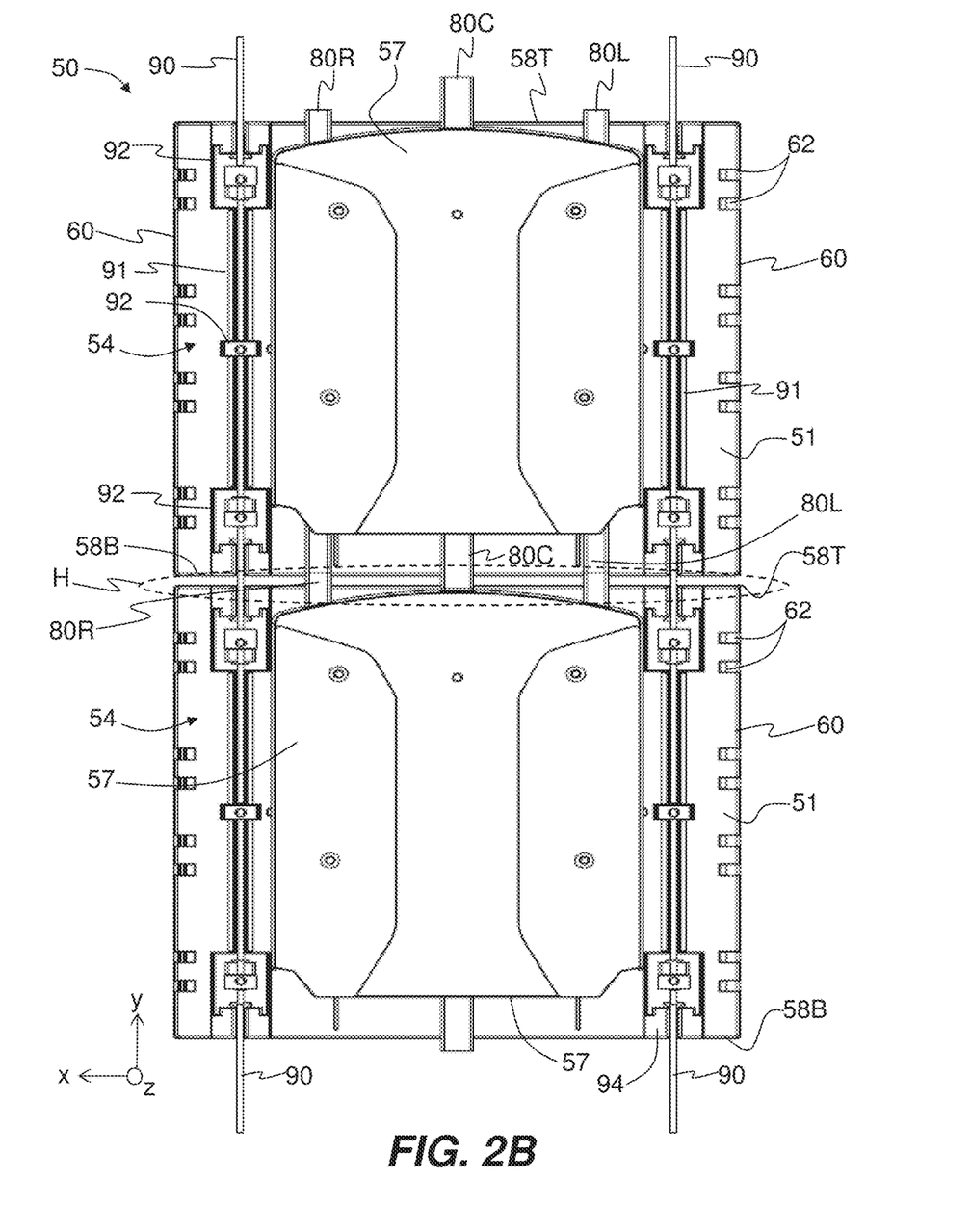

FIG. 2A is a close-up front-elevated view and FIG. 2B is a close-up back-elevated view of two example foldable panels 52, denoted 52T and 52B for "top" and "bottom."

Two or more connected panels 52 define a panel assembly. Each panel 52 has a front side or front face 54 and a back side 56, a top edge 58T a bottom edge 58B, and opposite side edges 60. The front side 54 of each panel 52 defines a plane and includes light-emitting pixels 72 operably disposed therein to form an array 70 of pixels. The plane defined by the front face 54 of panel 52 may be substantially flat or may comprise one or more curvatures. The back side 56 optionally includes a protective cover 57 as best seen in FIG. 2B.

Figure 2C:
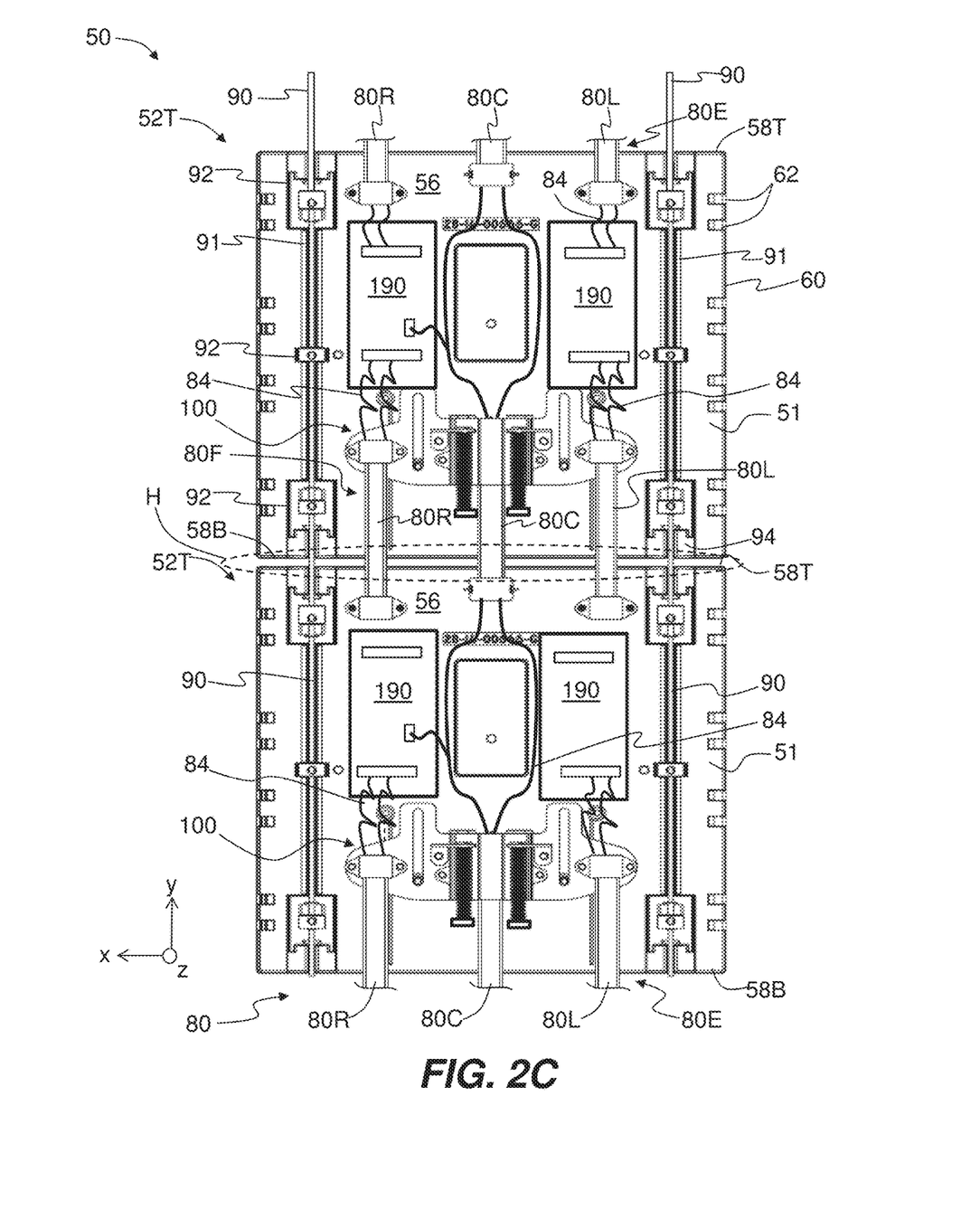
FIG. 2C is similar to FIG. 2B, but with the back cover removed to show the spring-loaded slide assembly and the electrical cable configuration that allow for movement of the spring-loaded slide assembly.
Figure 2D:
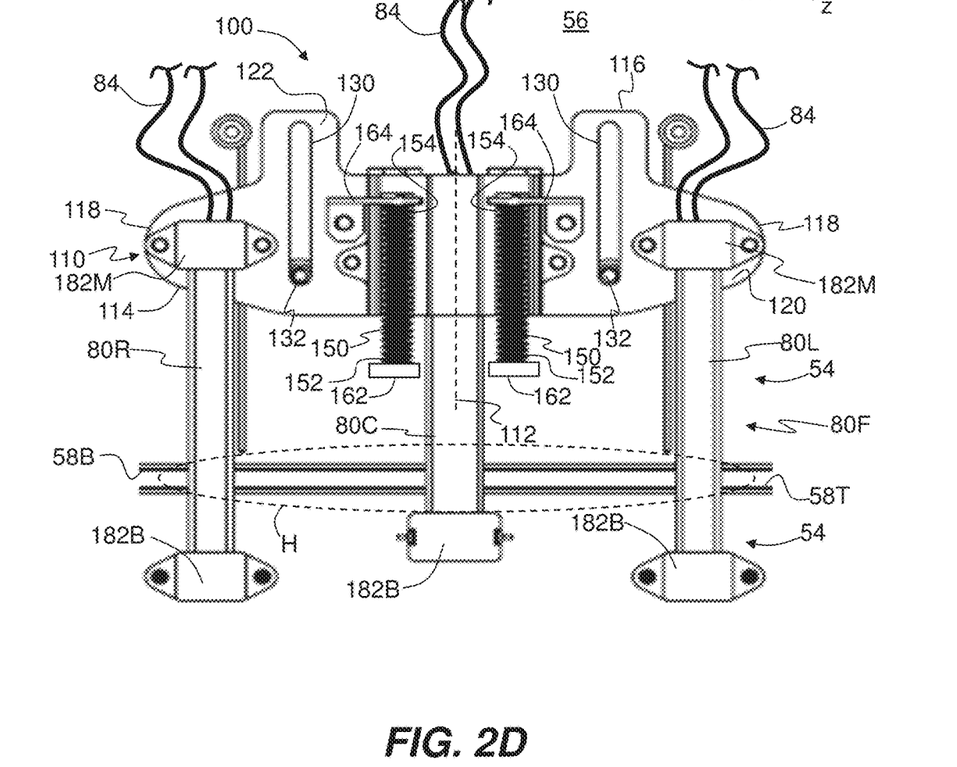
FIG. 2D is a close-up view of the spring-loaded slide assembly.
Figure 2E:
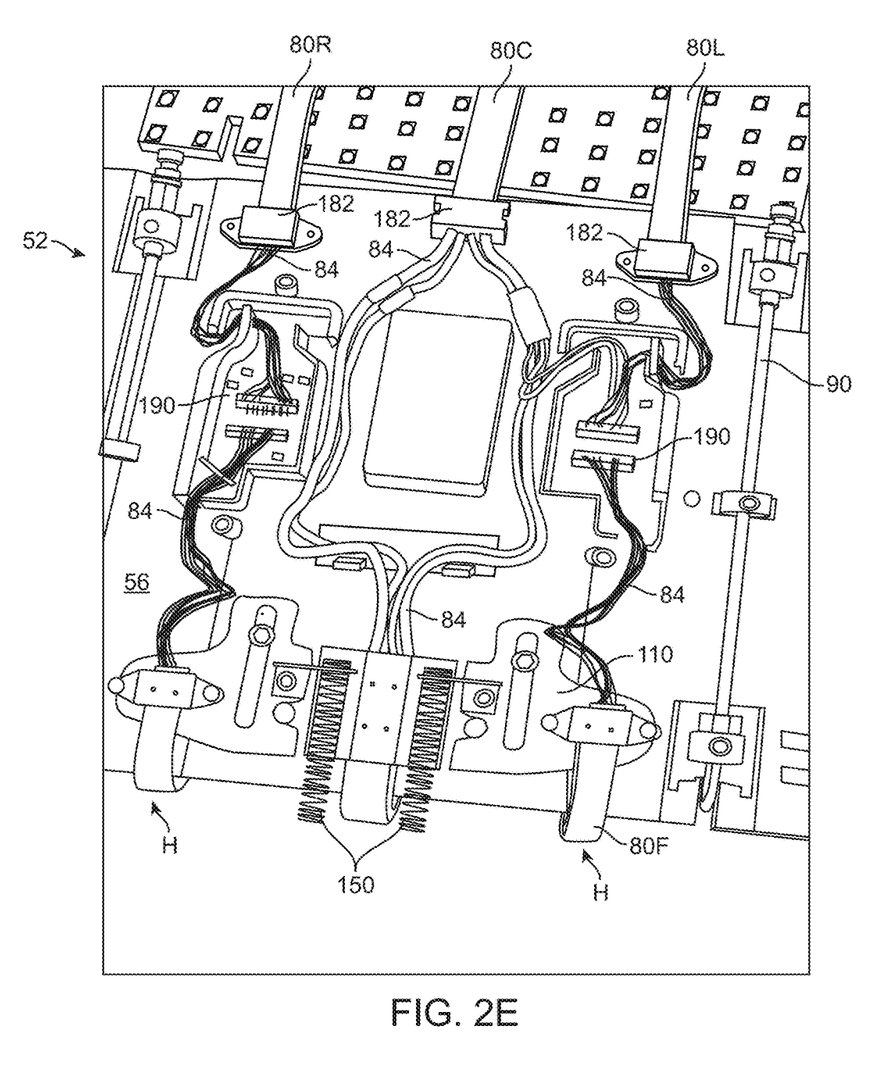
FIG. 2E is a close-up view of the back side of the display panel showing more detail of the example slide assembly, the data and power wires, and the printed circuit boards supported at the back side of the display panel.
Figure 3:
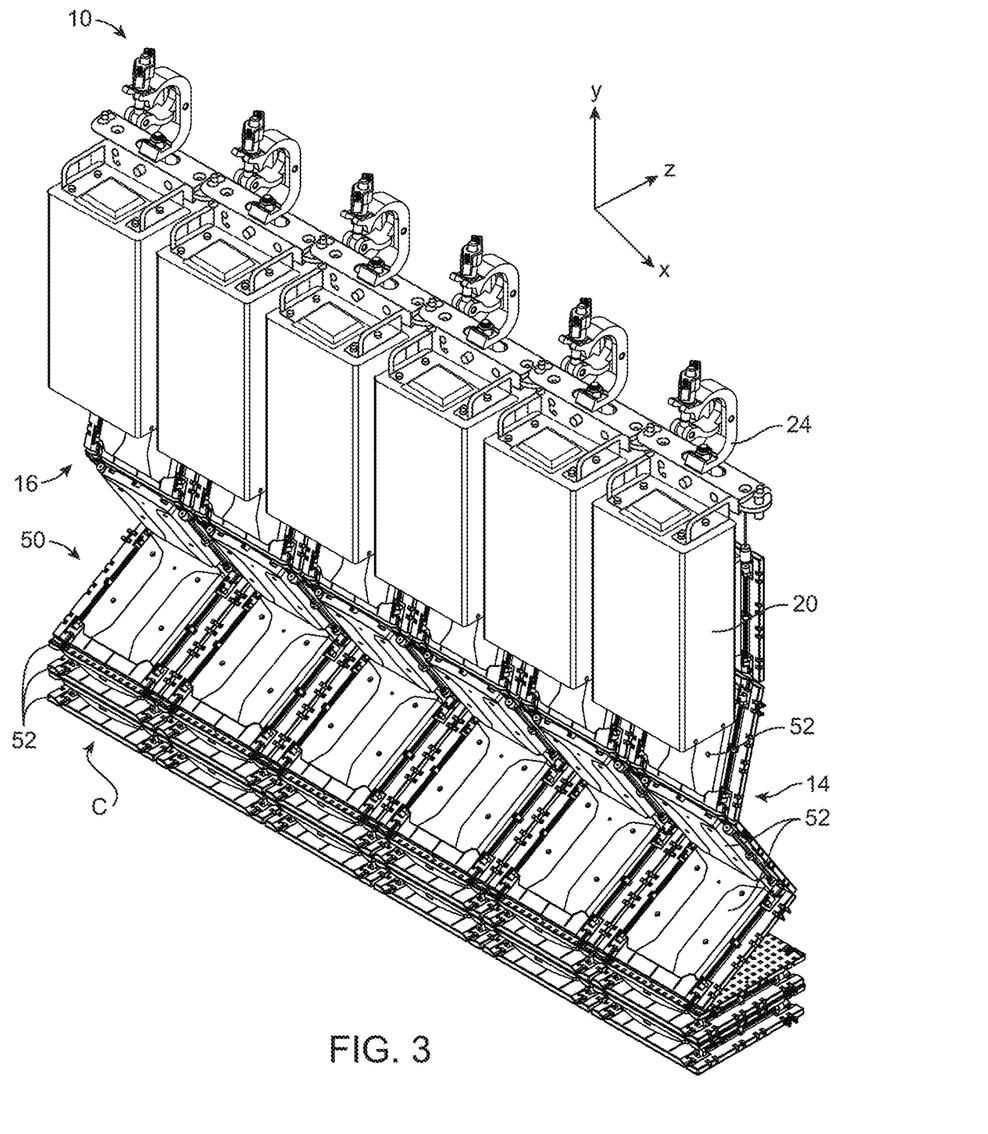
FIG. 3 is a back elevated view of the LFD system, showing how the display panels in each column of display panels can be z-folded.

FIG. 2C is similar to FIG. 2B, except that cover 57 is removed to show the various components supported on the back side 56, as explained below. The side edges 60 include slots 62 that can accommodate fixed or removable clips (not shown) that connect to adjacent panels 52 in adjacent columns C. In some implementations, electrical connections may be established via slots 62 such that only one assembly 50 of panels 52 in an LFD system 10 needs to include certain cabling or connections (e.g., one or more electrical cables 80) while any adjacent, connected panels and, optionally, any panels joined similarly to those adjacent, connected panels, and any panels joined with those, etc., may receive power and/or data in a "daisy chained" sequential fashion. Each panel 52 includes a body 51 that supports on the back side 56 and/or in an interior (not shown) various components, such as wiring, cabling, and other electrical mechanical parts, such as printed circuit boards (PCBs), wire guides, etc. FIGS. 2D and 2E are close-up views similar to FIG. 2C that illustrates in more detail the aforementioned various components supported on the back side 56 of panel 52.

Each panel 52 may include one or more electrical cables 80, e.g., three electrical cables 80L, 80C, and 80R on the left, center and right of the panel, respectively (when viewed from the front side 54), which run between the bottom edge 58B and the adjacent top edge 58T of adjacent panels 52, as described in greater detail below. The electrical cables 80 carry data and power. In an example, data and power are carried separately, e.g., data is carried in electrical cables 80L and 80R and power is carried in electrical cable 80C, although other implementations may be used. In some implementations, power and/or data communication mediums other than cables may be used, e.g., via wireless energy transmission or other suitable techniques, in place of or alongside other cables (for data and/or for power).

Two flexible support cables 90 run in grooves 91 that run down the back side 56 of the panels 52 from top edge 58T to bottom edge 58B in a given column C to support the columnar arrangement of the panels in their deployed state (although a single, central support cable or other configuration may be used). In an example, support cables 90 are made of steel; in various embodiments, the support cables may be either continuously flexible or flexible in a piecewise fashion (e.g., inflexible segments joined by flexible segments or portions). Cable guides 92 on back side 56 of each panel 52 are used to maintain the support cables substantially parallel to side edges 60. The support cables 90 serve to keep the panels in a given column C flexibly connected. In some implementations, support cables 90 may include a stopper (not shown) at their lower end (e.g., the end associated with the lowest panel 52 in an assembly 50) such that the stopper prevents a lowest panel in an assembly, and thus the other panels in the assembly, from sliding off the end of the cables. Further, in some implementations, support cables 90 may be attached to a horizontal rotating drum (or winch; not shown) disposed in or otherwise attached or disposed in association with an electrical power and data unit 22, which may be turned by a crank or automatedly by motor or other power source. By using a stopper and a winch with support cables 90, panels 52 can be easily and optionally automatedly folded and unfolded. In some embodiments where adjacent columns C of panels 52 connect to one another, e.g., via slots 62 and/or clips, only a single winch may be used such that, referring to FIG. 1 for example, only one electrical power and data unit 22-1 (or other portion of assembly 50 in column C1) includes a winch, which, through the panels' connections to one another between adjacent columns, is operable to fold and unfold each assembly 50 in LFD system 10. The support cables 90 are flexible and (together with fixed-length cable sections 80F, discussed below) define a folding mechanism or flexible hinge mechanism H that facilitates a z-folding capability of each column C (or assembly 50) of panels 52. Notably, hinge H may not necessarily comprise features commonly associated with a traditional door hinge. In some embodiments, hinge H may comprise cables and/or wires that mechanically connect panels 52 without necessarily limiting the degrees of freedom of movement possible between the panels; however, in some embodiments, the hinge may be designed and configured to act more like a traditional door hinge, thus limiting one or more degrees of freedom of movement possible between panels 52.

The back side 56 of panel 52 may include a slide assembly 100, as shown in the close-up views of FIGS. 2D and 2E. In an example, slide assembly 100 is located adjacent bottom edge 58B on each panel 52. The slide assembly 100 may include a movable member 110 that in an example is in the form of a plate. As shown in FIG. 2D, movable member 110 has a centerline 112, a bottom edge 114, a top edge 116, opposite side edges 118, a top surface 120 and bottom surface 122; however, other orientations may be used. In an example, the configuration of slide assembly 100 is substantially symmetric about centerline 112.

The movable member 110 includes, in one implementation, a pair of elongate guide slots 130 that each run in the y-direction (see axes in FIG. 2D) on opposite sides of centerline 112. The guide slots 130 accommodate respective guide members 132 fixed to back side 56. In one embodiment, a pair of resilient members 150 (e.g., springs) are arranged, one on each side of centerline 112, on or proximal to top surface 120. Each resilient member 150 includes a front end 152 and a back end 154. Each resilient member 150 is operably arranged between a front-end wall 162 and a back-end wall 164. The back-end wall 164 is attached to the top surface 120 of movable member 110. The front-end wall 162 is either fixed to back side 56 or is incorporated into cover 57 and engages the front end 152 of resilient member 150 when the cover is properly positioned on back side 56. Thus, in an example, slide assembly 100 is spring loaded.

The slide assembly 100 also includes securing members 182M that serve to secure end portions of each electrical cable 80 to movable member 110, and securing members 182B that serve to secure the opposite end portions of each electrical cable 80 to the back side 56 of the adjacent panel 52, although in some implementations another slide assembly may be used per panel such that each panel may include two slide assemblies and each electrical cable may extend between securing members like securing members 182M on opposing ends of adjacent panels in an assembly 50. The securing members 182M and 182B define respective fixed-length sections 80F for electrical cables 80. The fixed-length sections 80F run between and electrically and mechanically connect adjacent panels 52. The fix-length cable sections 80F therefore comprise the aforementioned hinge H, which can bend forwards or backwards, thereby providing the z-folding capability for the panel assembly 50.

The electrical cables 80 each include one or more wires 84. As shown in FIG. 2E, the wires 84 for electrical cables 80L and 80R may be loosely connected to respective PCBs 190 supported on back side 56 of the same panel 52 as the movable member 110. In the example shown, wires 84 in electrical cables 80L and 80R are used to supply data and so are referred to as "data wires." The wires 84 for electrical cable 180C are shown as "power wires" that carry power. The power wires 84 may loosely travel over back side 56 (e.g., through open channels defined by structures on back side 56), with some of the power wires running to the adjacent panel 52 and at least one of the power wires may be electrically connected to one of the local PCB's 190 or otherwise supply power to the panel. In this manner, power can be conveyed from the given electrical power and data unit 22 down to each of the panels 52 in assembly 50 for a given column C. The data wires 84 can include a service loop or portion that includes an amount of slack. The amount of slack is used to accommodate the movement of movable member 110, as described below.

Figure 4A:
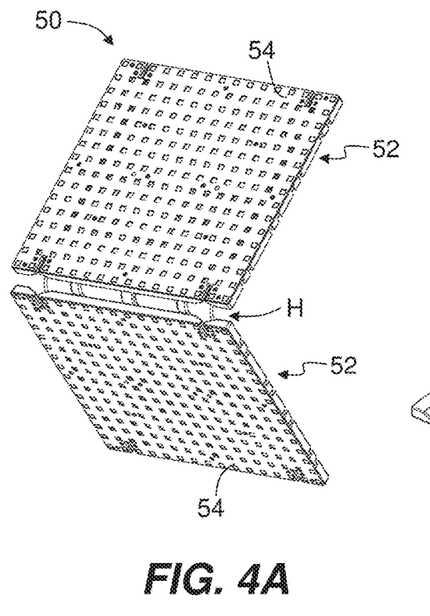
FIGS. 4A through 4C show three views of the display panel assembly of FIG. 2 being z-folded in a back-to-back configuration.
Figure 4B:
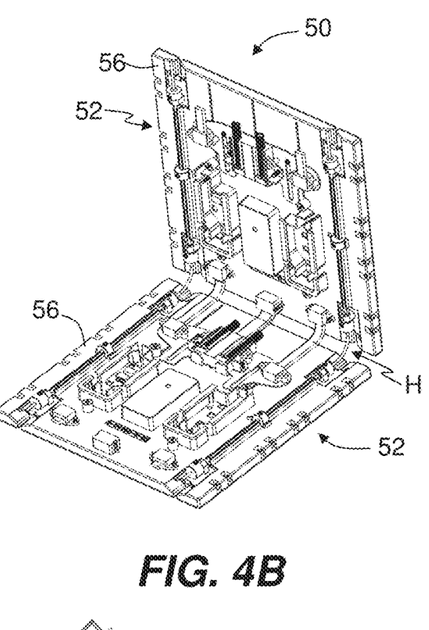
Figure 4C:
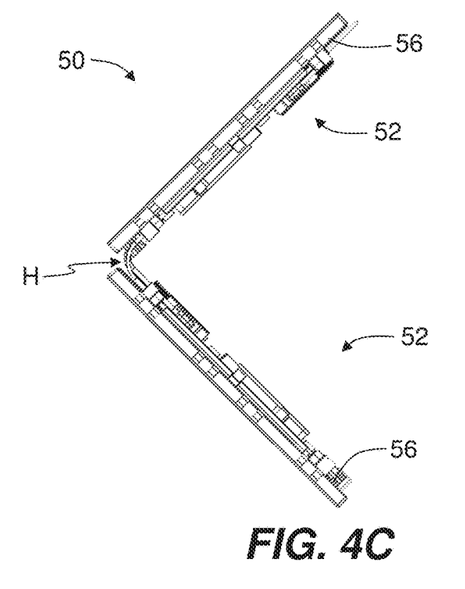
Figure 5A:
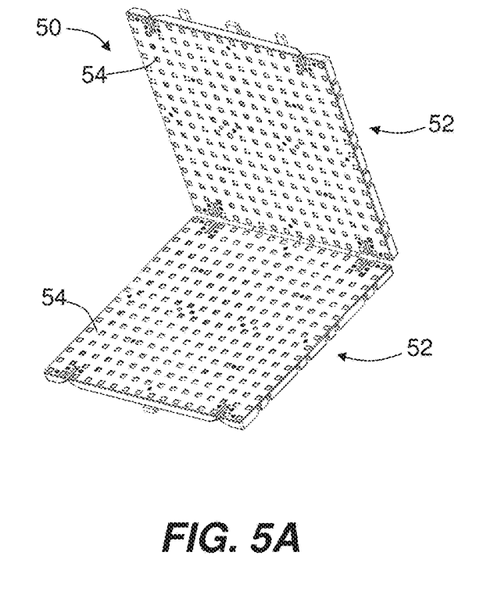
FIGS. 5A through 5C show three views of the display panel assembly of FIG. 2 being z-folded in a front-to-front configuration.
Figure 5B:
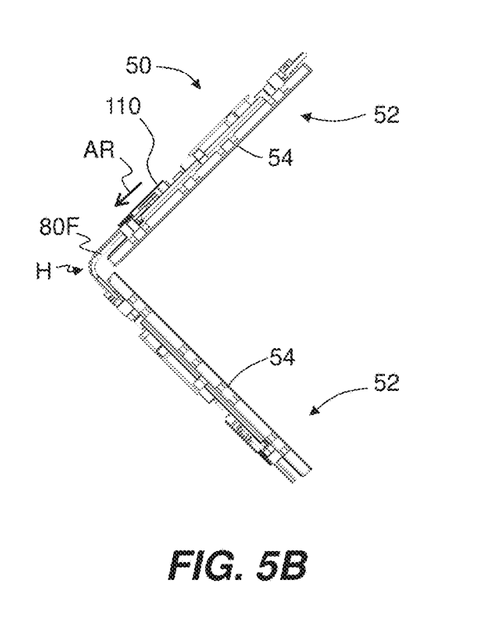
Figure 5C:
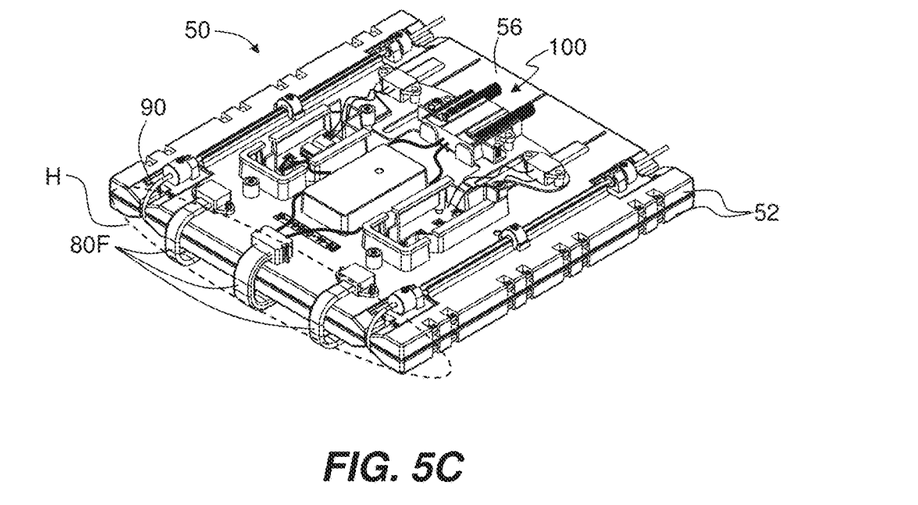

As noted above, electrical cables 80R, 80C, and 80L serve to electrically connect adjacent panels 52 in a given column C while also mechanically connecting the adjacent panels by defining the aforementioned bi-folding hinge H. The support cables 90 also form a portion of hinge H and serve to mechanically connect adjacent panels 50 in a given column C. The z-folding capability of hinge H is illustrated in FIGS. 3, 4A through 4C, and FIGS. 5A through 5C. The z-folding capability means that the panels 52 can be z-folded (i.e., in the z direction) back-to-back (as shown in FIGS. 4A through 4C) or face-to-face (as shown in FIGS. 5A through 5C), thereby allowing for efficient stacking of the panels for storage.

FIGS. 5A through 5C are different views of two adjacent panels 52 illustrating the face-to-face z-folding operation. During the face-to-face folding operation, if one of the ends of the fixed-length sections 80F of electrical cables were not movable, they would need to "stretch" to become longer because of the bending radius required or would require slack to accommodate the folding operation. However, in some embodiments, rather than stretching or providing slack to the fixed-length cable section 80F, the movable member 110 moves toward the bottom edge 58B of the panel 52 on which it resides as the two adjacent panels are folded front-to-front (see arrow AR in FIG. 5B). The movement of movable member 110 is guided over back side 56 by guide members 132 within guide slots 130 (see FIG. 2D). This movement allows for the fixed-length sections 80F of cables 80 to retain a substantially uniform tension during the folding and unfolding process, thereby preventing binding of the electrical cables, while also making the panels easier to fold and unfold. In other embodiments, movable member 110 may be positioned adjacent top edge 58T, excluding perhaps the top-most panel 52 in the column C, with the result that as adjacent panels 52 are folded face-to-face, the movable member will move toward top edge 58T.

During the movement of movable member 110 during the face-to-face folding operation (e.g., as shown in FIGS. 5A through 5C), the resilient members 150 are compressed between front-end wall 162 and back-end wall 164 as these two walls move closer to one another (see FIG. 2D). Meanwhile, the fixed-length sections 80F of electrical cables 80 flex or bend to accommodate the folding operation at hinge H (see FIG. 5B). The slack portion of wires 84 (see FIGS. 2D and 2E) accommodates the movement of movable member 110 by giving up and receiving an amount of slack during the folding and unfolding process. Also, during the face-to-face folding operation (see FIGS. 5A through 5C), the resilient members 150 store energy so that the slide assembly 100 becomes spring loaded.

When the front-to-front folded panels 52 are unfolded into their straight or aligned configuration, the stored energy in resilient members 150 pushes movable member 110 back to its unfolded position, while an amount of slack in wires 84 that was given up in the folding process is returned to the wires. In this manner, the fixed-length sections 80F of cables 80 that run between adjacent panels 52 remain substantially taut, with a substantially uniform tension. This facilitates deployment of the LFD system 10 by avoiding tangling of electrical cables 80 while helping to pull adjacent panels 52 together to ensure that tight spacing between the adjacent panels is maintained.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A folding display panel apparatus, comprising:
   a plurality of columns of display panels, each of the columns of display panels configured to transition between a collapsed z-folded configuration and an expanded configuration, wherein each of the columns of display panels includes:
   first and second ones of the display panels that each include a front side having an array of light-emitting pixels, a back side having a movable member, a top edge, opposite side edges and a bottom edge, with the first and second display panels arranged edge-to-edge;
   at least one flexible support cable that mechanically and flexibly connects the first and second display panels and that is configured to support the first and second display panels in a vertical arrangement and to fold with the first and second display panels into a collapsed arrangement; and
   at least one electrical cable that electrically connects the first and second display panels, the at least one electrical cable including at least one data wire and at least one power wire, the at least one electrical cable having a fixed-length cable section that runs between the first and second display panels, wherein one end of the fixed-length cable section is attached to at least one of the first or second display panel movable members, and wherein the data and power wires each have an amount of slack that resides outside of the fixed-length cable section adjacent the movable member,
   wherein the movable member is configured so that when the first and second display panels are folded front-side to front-side, the movable member moves toward an edge of the one of the first and second display panels to accommodate a bend in the fixed-length cable section of the at least one cable, while the amount of slack in the data and power wires changes.

2. The folding display panel apparatus according to claim 1, wherein the at least one data wire and the at least one power wire are electrically connected to a printed circuit board supported on the back side of the second display panel.

3. The folding display panel apparatus according to claim 1, wherein the movable member includes a plate and at least one spring for resisting movement of the plate, whereby the movable member is spring loaded.

4. The folding display panel apparatus according to claim 1, wherein the movable member includes guides to permit sliding movement in a guided manner along the back side of the second display panel.

5. The folding display panel apparatus according to claim 4, wherein the movable member engages and compresses a resilient member when the movable member moves towards the edge of the one of the first and second display panels.

6. The folding display panel apparatus according to claim 1, wherein the at least one electrical cable includes a first electrical cable that carries electrical power via the at least one power wire, and a second electrical cable that carries display data via the at least one data wire.

7. The folding display panel apparatus according to claim 1, wherein the at least one flexible support cable includes a pair of flexible support cables that run substantially parallel to and inboard of the side edges of each of the first and second display panels and that mechanically and flexibly connect the first and second display panels.

* * * * *